United States Patent
Bates et al.

(10) Patent No.: US 6,817,697 B2
(45) Date of Patent: Nov. 16, 2004

(54) SYSTEMS AND METHODS FOR PRINTHEAD ARCHITECTURE HARDWARE FORMATTING

(75) Inventors: John Bates, Harrodsburg, KY (US); David Allen Crutchfield, Lexington, KY (US); James Alan Ward, May's Lick, KY (US)

(73) Assignee: Lexmark International, Inc., Lexington, KY (US)

( * ) Notice: Subject to any disclaimer, the term of this patent is extended or adjusted under 35 U.S.C. 154(b) by 59 days.

(21) Appl. No.: 10/412,825

(22) Filed: Apr. 14, 2003

(65) Prior Publication Data

US 2004/0201642 A1 Oct. 14, 2004

(51) Int. Cl.[7] ................................................ B41J 2/205
(52) U.S. Cl. ............................ 347/41; 347/15; 358/517
(58) Field of Search ...................... 347/41, 15; 358/1.6, 358/517, 524, 1.8, 1.13, 1.15

(56) References Cited

U.S. PATENT DOCUMENTS

| | | |
|---|---|---|
| 5,483,625 A | 1/1996 | Robertson et al. |
| 5,497,450 A | 3/1996 | Helmbold et al. |
| 5,815,172 A | 9/1998 | Moh |
| 5,845,055 A | 12/1998 | Murata |
| 5,867,183 A | 2/1999 | Cornell et al. |
| 5,917,993 A * | 6/1999 | Inuyama et al. ............. 358/1.9 |
| 5,926,201 A | 7/1999 | Fleming et al. |
| 5,987,270 A | 11/1999 | Hulan et al. |
| 6,067,405 A | 5/2000 | Serra |
| 6,106,172 A | 8/2000 | No |
| 6,273,540 B1 | 8/2001 | Takamura et al. |
| 6,351,320 B1 | 2/2002 | Shin |
| 6,390,580 B1 | 5/2002 | Anderson et al. |

* cited by examiner

*Primary Examiner*—Lamson D Nguyen
(74) *Attorney, Agent, or Firm*—Gregory J. Kirsch, Esq.

(57) ABSTRACT

The present invention is directed to systems and methods for formatting hardware for a printhead, for use in a printing device. The systems and methods of the present invention can support the formatting function with hardware formatting logic. This hardware formatting logic can support multiple printhead platforms. The hardware formatting logic of the present invention can perform bit shifting, resolution reduction, bit per pixel reduction, data masking for shingling, and input data sourcing. The present invention can also include a system processor further including an embedded ARM processor which can fetch and execute instructions and/or firmware. These instructions can direct the embedded processor to configure a format block included within the system processor. The format block can be configured by the system processor via one or more control registers.

21 Claims, 7 Drawing Sheets

SYSTEMS AND METHODS FOR PRINTHEAD ARCHITECTURE HARDWARE FORMATTING

BACKGROUND

The present invention is directed to systems and methods for formatting hardware for a printhead, for use in a printing device. More specifically, and without limitation, the present invention relates to systems and methods for formatting data for multiple printhead architectures from a single ASIC (application specific integrated circuit).

In some cases, image data to be printed using a printhead that has vertically arranged imaging elements requires formatting prior to printing. The kind and order of format operations may vary depending on the arrangement of imaging elements and the output desired.

Printer drivers known in the art contain a data format function that can format halftoned data. The type of formatting performed depends on the shingling mode and the head architecture targeted for reception of the formatted data. If the printhead dot addressability is less than the dots per inch (DPI) of the raster, the raster must be split into multiple passes.

In some environments, even print data at the printhead DPI is divided among multiple passes of a printhead. This process is known as shingling and a mask is used to determine which bits of print data are sent on which pass. In some environments, 2 bpp (bit per pixel) data must be combined into 1-bpp data prior to printing. Some printheads require that certain rasters be shifted to accommodate horizontally nonlinear nozzle arrangements. Given the wide variety of possible printhead architectures and the corresponding variety of requisite data formats, it would be advantageous to use a single hardware device capable of formatting data required for a variety of printheads.

In a general purpose computer system, driver software can be used to perform data formatting functions. However, embedded stand-alone systems generally cannot perform such formatting as quickly as software running on a general purpose processor. The present invention provides a cost-effective, high-performance solution by offloading bit manipulation intensive operations to dedicated hardware. The dedicated hardware of the present invention has the capability of supporting many different printhead architectures and performing data manipulation steps with the flexibility of a software driver. Some embodiments of the present invention including a high-performance ASIC coupled with an inexpensive embedded processor can perform the tasks necessary for formatting data in a timely manner without requiring an expensive high-end processor.

SUMMARY

The present invention is directed to systems and methods for printhead architecture hardware formatting. One preferred embodiment according to the present invention includes a system processor that supports the desired functionality as described in detail below and a system data store (SDS) that stores data associated with this functionality such as raster image data.

The SDS may include multiple physical and/or logical data stores for storing the various types of information used. Data storage and retrieval functionality can be provided by either the system processor or one or more data storage processors associated with the SDS. The system processor is in communication with the SDS via any suitable communication channel(s). The system processor may include one or more processing elements that are adapted or programmed to support the desired data formatting and/or other functionality.

Accordingly, one preferred method of printhead data formatting includes a variety of steps that may, in certain embodiments, be executed in the environment summarized above and more fully described below or may be stored as computer executable instructions on any suitable combination of computer-readable media. In accordance with one preferred embodiment of the present invention, computer executable instructions are stored in a system data store.

Figure 7A:
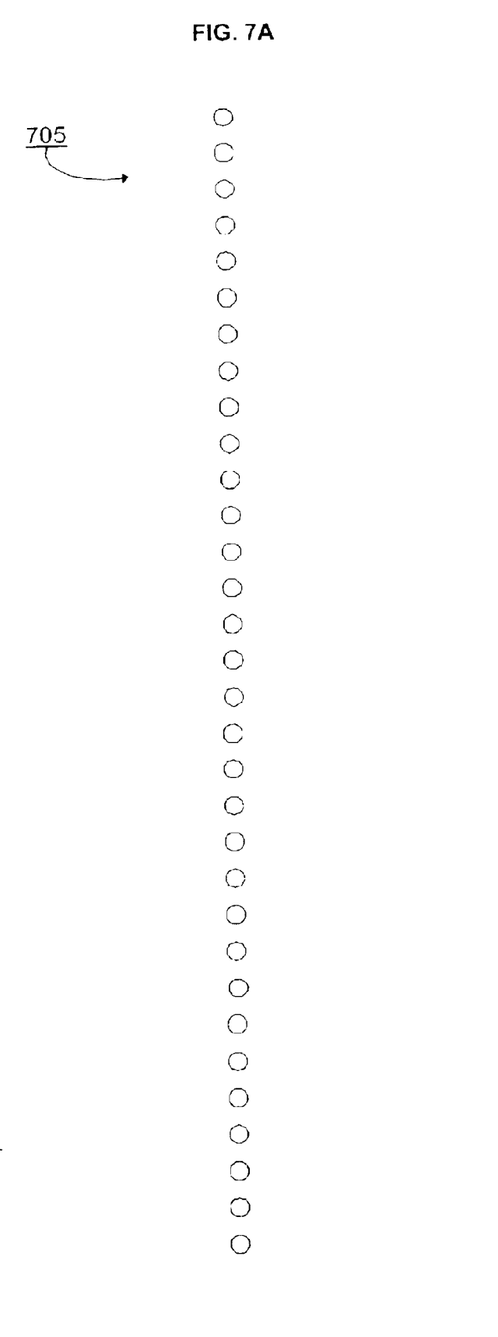
FIGS. 7A and 7B depict two exemplary printhead nozzle arrangements.
Figure 7B:
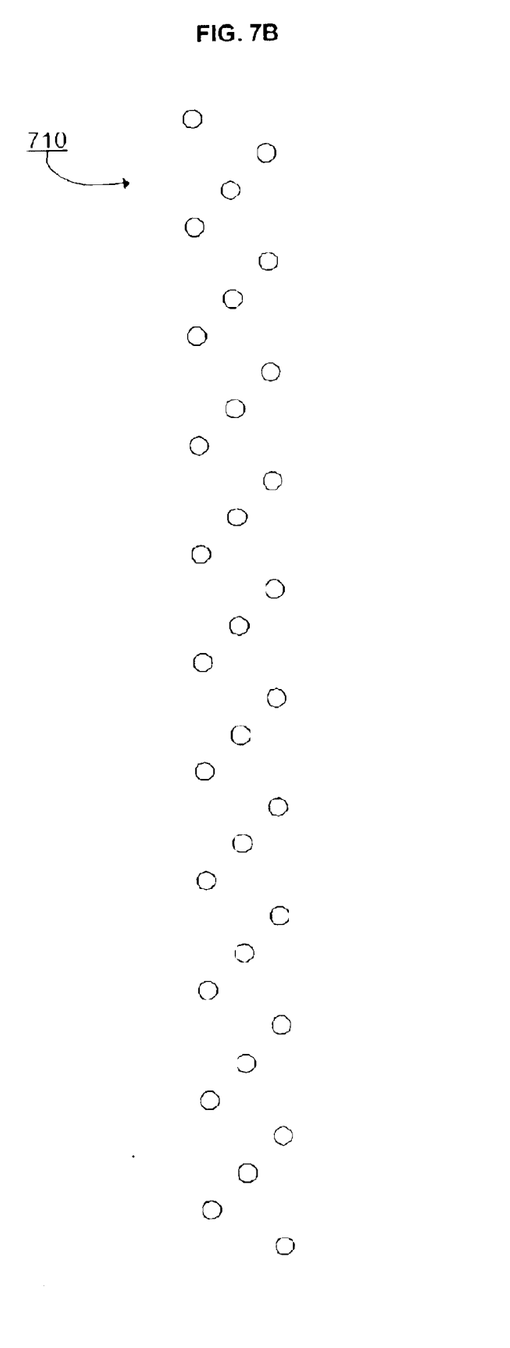

The systems and methods of the present invention can support the formatting function with hardware formatting logic. This hardware formatting logic can support multiple printhead platforms. As non-limiting examples, the printhead architectures depicted in FIGS. 7A and 7B can be supported. The hardware formatting logic of the present invention can perform unidirectional bit shifting, automatic resolution reduction, bit per pixel (bpp) reduction, data masking for shingling, and input data sourcing from an SDS. Some embodiments can indicate if the data swath being processed contains data after the formatting function has been completed. This will allow a system processor to determine if the processed data should be passed further in the printing chain. Further embodiments can include hardware formatting logic pipelining and can process one descriptor per provided process clock.

Additional advantages of the invention will be set forth in the description which follows. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION

Exemplary embodiments of the present invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. Architecture of a Typical Hardware Formatting System Referring to FIG. 1, the hardware formatting system may include a system processor 101 potentially including multiple processing elements. The term processing element may refer to (1) a process running on a particular piece, or across particular pieces, of processing hardware, (2) a particular piece of processing hardware, or either (1) or (2) as the context allows. Each processing element can be supported via a standard general purpose processor such as an Intel-compatible processor platform. The system processor can include one or more field programmable gate arrays (FPGAs) and/or application specific integrated circuits (ASICs) configured to perform at least a portion of the functionality according to the present invention. In other embodiments, an embedded microprocessor can be used such as, but not limited to, an ARM (ARM, Carlsbad, Calif.) processor core.

In some embodiments, the system processor can include a combination of general purpose processors, ASICs and/or FPGAs. In some embodiments, data formatting functionality, as further described below, can be distributed across multiple processing elements. In some such embodiments, aspects of the functionality or portions thereof may be executed in series or in parallel; particular functionality or portions thereof executed a multiplicity of times may also occur in series or parallel.

Figure 1:
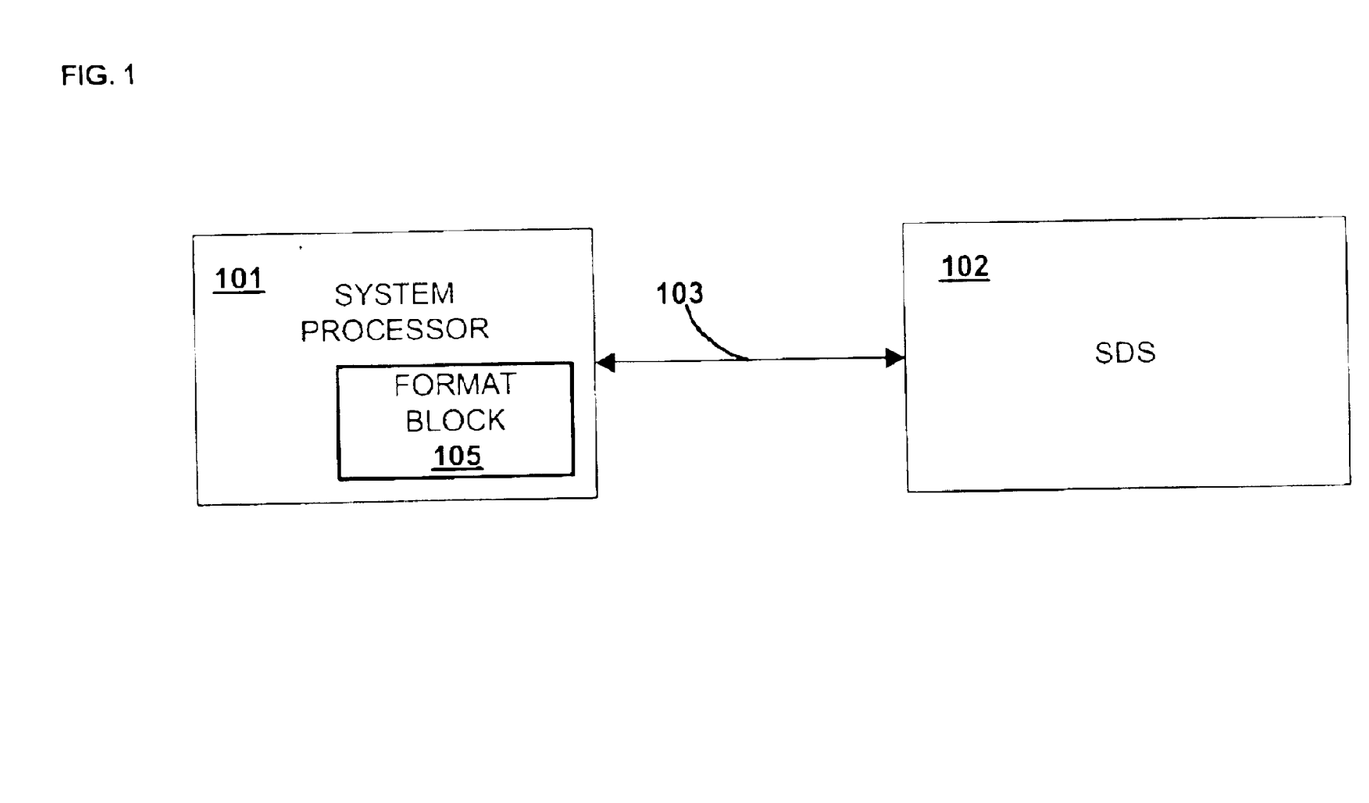
FIG. 1 depicts a block diagram of an exemplary system according to the present invention.

In one preferred embodiment, the system processor 101 includes an embedded ARM processor which can fetch and execute instructions and/or firmware from an SDS 102. These instructions can direct the embedded processor to configure a format block 105 included within the system processor 101. The format block is a set of dedicated logic in the system processor 101 which can perform a requested format operation on image data. The format block 105 can be configured by the system processor 101 via one or more control registers.

The system processor can access configuration information and a list of descriptors can be included in that configuration information. Instructions executed by the system processor can set configuration registers. The format block can then perform bit manipulations based on the current register configuration and descriptor. In some embodiments, one descriptor is used to control operation on each particular raster.

An SDS 102, in communication with the system processor 101 via a suitable communication channel 103, could include a variety of primary and secondary storage elements. In one preferred embodiment, the SDS 102 can include random access memory (RAM) as part of the primary storage. The amount of RAM might range from 8 MB to 128 MB in some embodiments. The primary storage can, in some embodiments, include other forms of memory such as cache memory, registers, nonvolatile memory (e.g., FLASH, ROM, EPROM, etc.), etc.

The SDS 102 communicates with the system processor 101 by one or more communication channels 103. Multiple channels can be involved in some embodiments for supporting communication between processing elements of the system processor 101 and portions of the SDS 102. Such channels can include, without limitation, computer network, dedicated connection, direct or indirect connection such as via a bus connection, parallel or serial connection, or other suitable channel as would be known to those skilled in the art.

One preferred embodiment of the present invention including an ASIC can also include a printhead interface component. Dedicated logic in the ASIC can be used to communicate print data from the SDS to the printhead. This logic can be configured by the system processor through a series of control registers in the ASIC.

Descriptor Format

Figure 2:
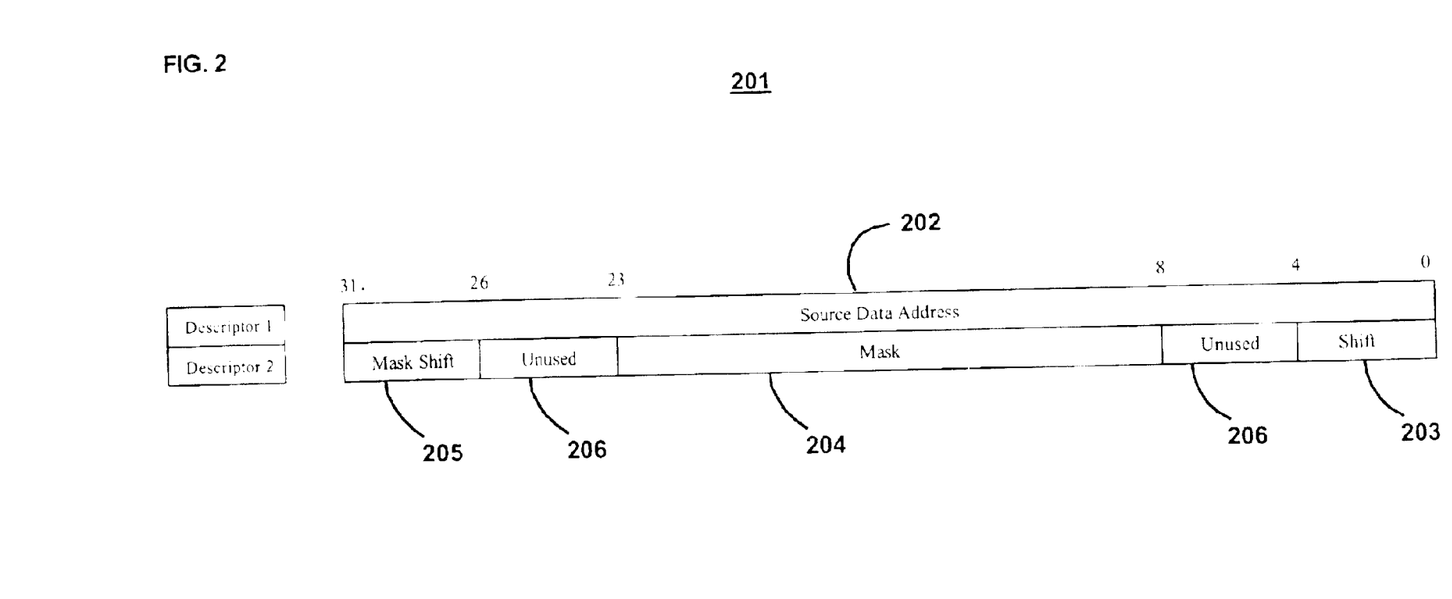
FIG. 2 depicts a pair of example descriptors as used in one preferred embodiment according to the present invention.

Referring to FIG. 2, in one preferred embodiment, a set of descriptors 201 can be read from an SDS 102 for each raster processed. The descriptors can include some or all of the following: a source data address 202, shift amount 203, mask 204, and mask shift amount 205. The exemplary embodiment depicted in FIG. 2 can leave some portions of the descriptor unused, 206.

Source Data Address

The source data address 202 can be used to indicate to the format block 105 within the system processor 101 the location in the SDS 102 of the raster to be processed. Thus, the format block 105 can process raster input data in any order required by the printhead architecture and selected print mode. This is useful for supporting multiple printhead architectures and obviates the need to copy the desired rasters into a temporary contiguous memory before processing. This saves a memory copy step and thereby increases system performance while reducing the total system memory required.

Shift Amount

The descriptor can include a shift amount 203. The shift amount 203 indicates how many bits the data is to be shifted. As non-limiting examples, the nozzle arrangement 710 depicted in FIG. 7B uses horizontally offset nozzles while the nozzle arrangement 705 depicted in FIG. 7A does not. By allowing bit shifting in the hardware, both designs can be supported by the same printhead format processor. One skilled in the art will recognize that the present invention can be adapted to work with other nozzle arrangements.

In one preferred embodiment, the shift can be unidirectional. Note that with unidirectional shifting only one shift amount is needed. This is further addressed below with regard to resolution reduction. Each line of raster image data can be associated with a shift amount contained within a descriptor.

Mask and Mask Shift

Masking and mask shifting can also be supported through a descriptor. A mask 204 is provided for properly removing portions of the data for shingling. As a non-limiting example, if 50% shingling is desired, then a mask of 0x55555555 can be used. This effectively turns every other dot off for the current pass of data. The next pass can use 0xAAAAAAAA for a mask. This would effectively enable the dots that were eliminated in the first pass. In some cases, it is required to shift the mask before it is applied. Shifting the shingle mask is associated with the horizontal nozzle offset. Two shift values are required, one for the data shift 203 and one for the shingle mask 205, when these steps are applied within the format processing pipe. The data shifting occurs before the possible horizontal resolution reduction in the data. The shingle mask is applied after the possible horizontal resolution reduction. So the two shift amounts are possible in different horizontal resolutions. Therefore, a separate mask shift amount 205 is also provided in the set of descriptors. FIG. 2 depicts an exemplary set of descriptors used in one preferred embodiment. The first descriptor of the set is the source data address. The second descriptor controls how the data will be masked and/or shifted. If desired, the descriptors 201 could be configured to contain more format information. One skilled in the art will recognize that additional printhead architectures can be supported with little modification of the raster formatting hardware and processes.

Resolution Reduction

Resolution reduction is accomplished in the preferred embodiment by the format block 105. As non-limiting examples, the operation modes allowed can be all bits, every second bit, every fourth bit and every eighth bit. As a non-limiting example, if the operation mode has been set to every fourth bit, then the hardware can build 32 bit words internally using every fourth bit contained within four input 32 bit words in the source data. A resolution reduction mode indicator indicative of the selected resolution reduction mode can be stored in a configuration register.

Note that the following mask patterns can be used to represent the bits chosen for each exemplary operation mode allowed: 0xFFFFFFFF (all), 0x55555555 (second), 0x11111111 (fourth) and 0x01010101 (eighth). These patterns were chosen to allow unidirectional shifting to the right. This horizontal data shifting is the first operation in the format block 105. The horizontal data shift can account for the horizontal offset of each nozzle within a printhead and permit selection of which group of bits to retrieve when resolution reduction is required.

As a non-limiting example, every second bit can be selected with the mask represented by 0x55555555. Such a mask can be used, for example, to build two separate 600 DPI horizontal resolution swaths from a 1200 DPI horizontal raster. As a non-limiting, illustrative example, if the bits in a byte of the 1200 DPI horizontal raster are represented as xyxyxyxy, and it is desirable to use the even bits xxxx of a 1200 DPI input raster for one of the two swaths, and the hardware, by design, will always select the odd bits 01010101, to select the even bits on the 1200 DPI input raster, 1 is added to the horizontal shift amount. Because the horizontal shift occurs before the resolution reduction, the input data is transformed from xyxyxyxy to 0xyxyxyxy. The data selected in the resolution reduction step will then be xxxx. By combining the two shift requirements for the 1200 DPI horizontal rasters into one step, processing time and system processor gate size may be reduced.

Two Bit Per Pixel Data

In some printhead and/or print mode combinations, two drops of ink may be required at a pixel location. In such a case, pixels are represented by two bits per pixel instead of one in the input raster data, and, in some embodiments, a printhead will pass over each pixel location at least twice.

Figure 4:
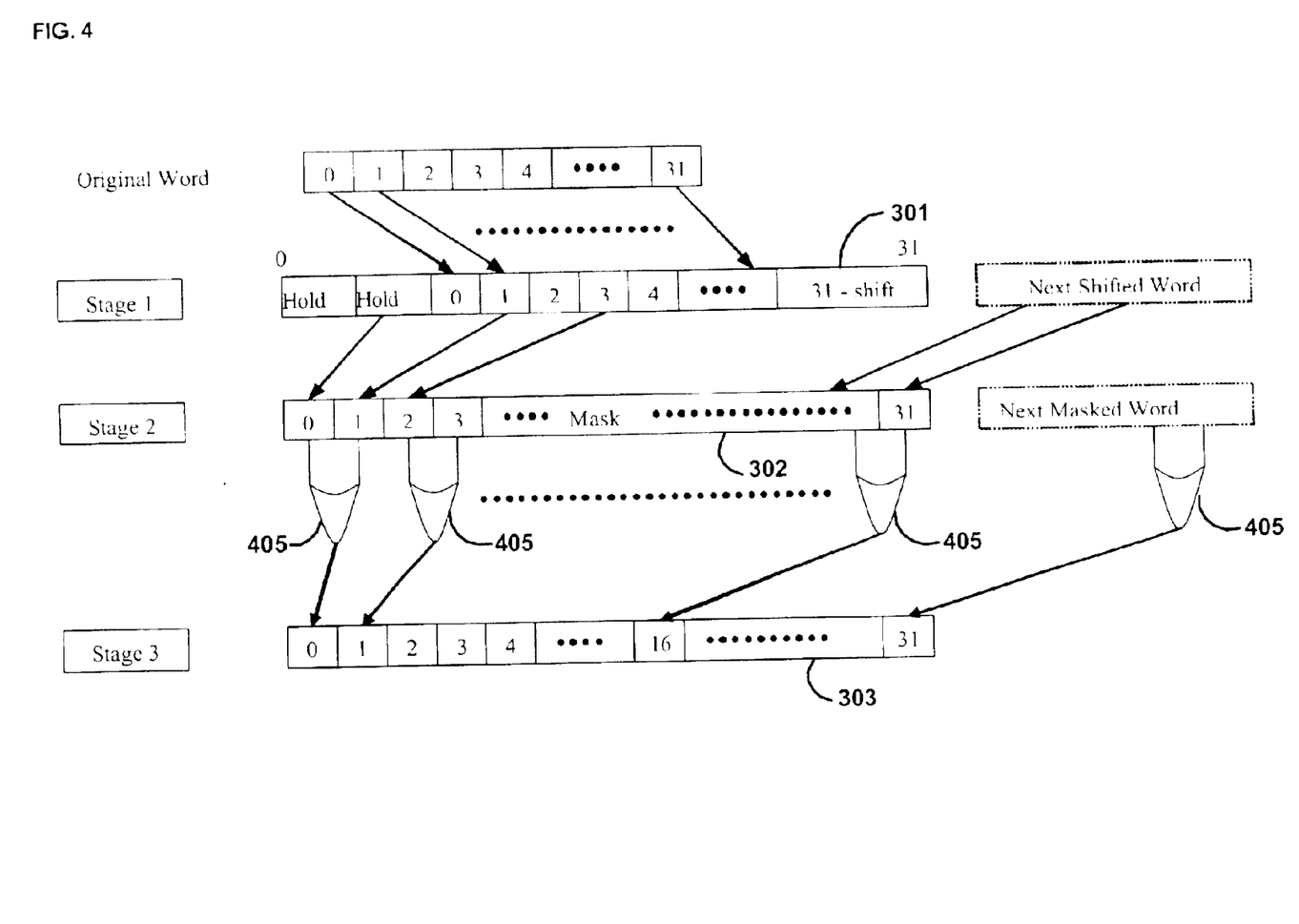
FIG. 4 depicts an exemplary pipeline for a 2-bit per pixel format function as used in one preferred embodiment according to the present invention.

In the 2-bpp case, it is necessary to shingle the 2-bpp data and reduce the 2-bpp data to 1-bpp for each pass of the printhead over a pixel location. The format block can apply selected shingling mask patterns to the set of even bits and the set of odd bits in the input raster line. FIG. 4 depicts the pipelined architecture of the hardware format function for 2-bpp data. As depicted in FIG. 4, the 2-bpp data can be converted to 1 bpp data by combining each two adjacent bits together using a logical OR 405 to represent a single dot location.

Figure 3:
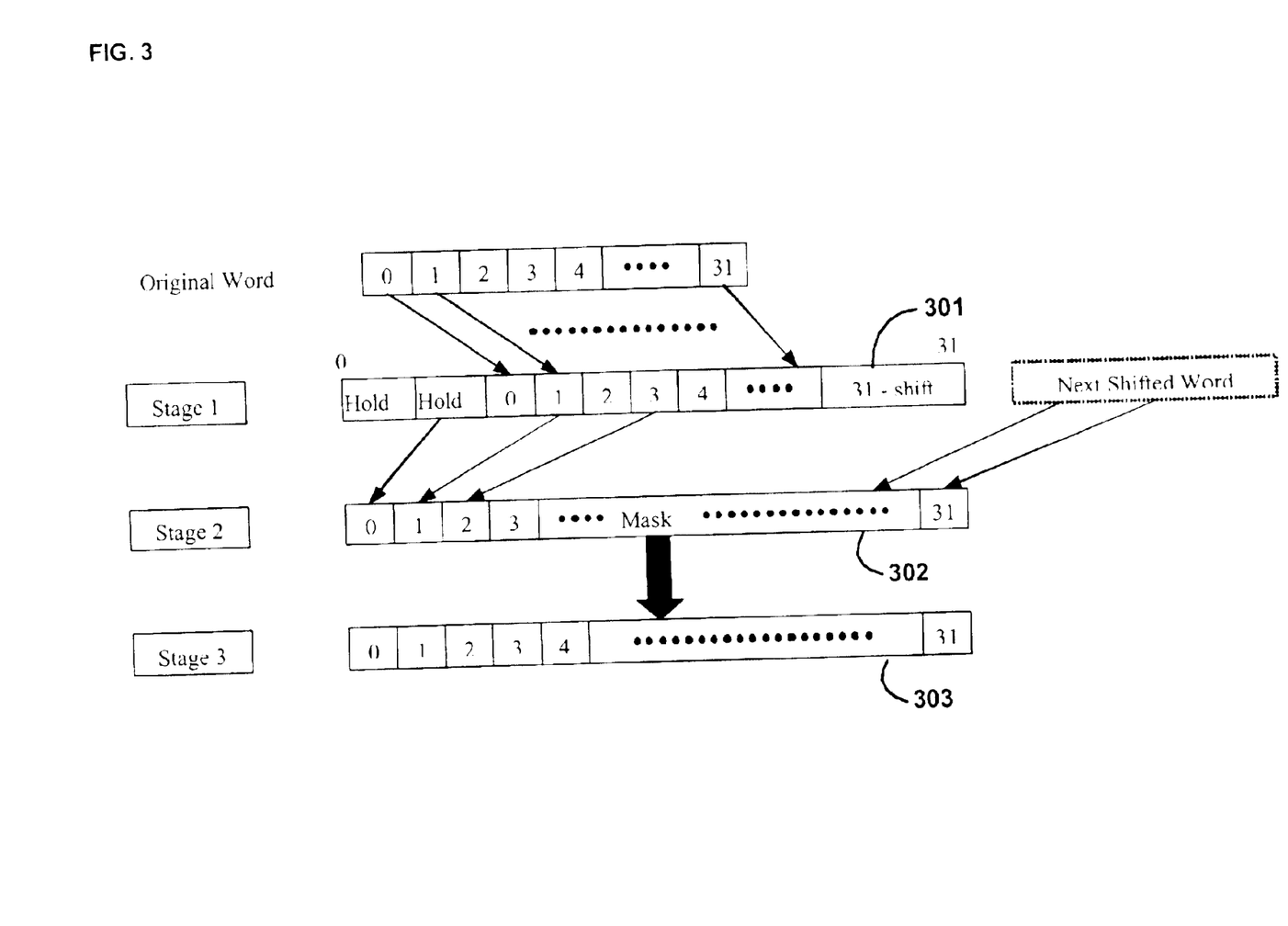
FIG. 3 depicts an exemplary pipeline for a 1-bit per pixel format function as used in one preferred embodiment according to the present invention.
Figure 5:
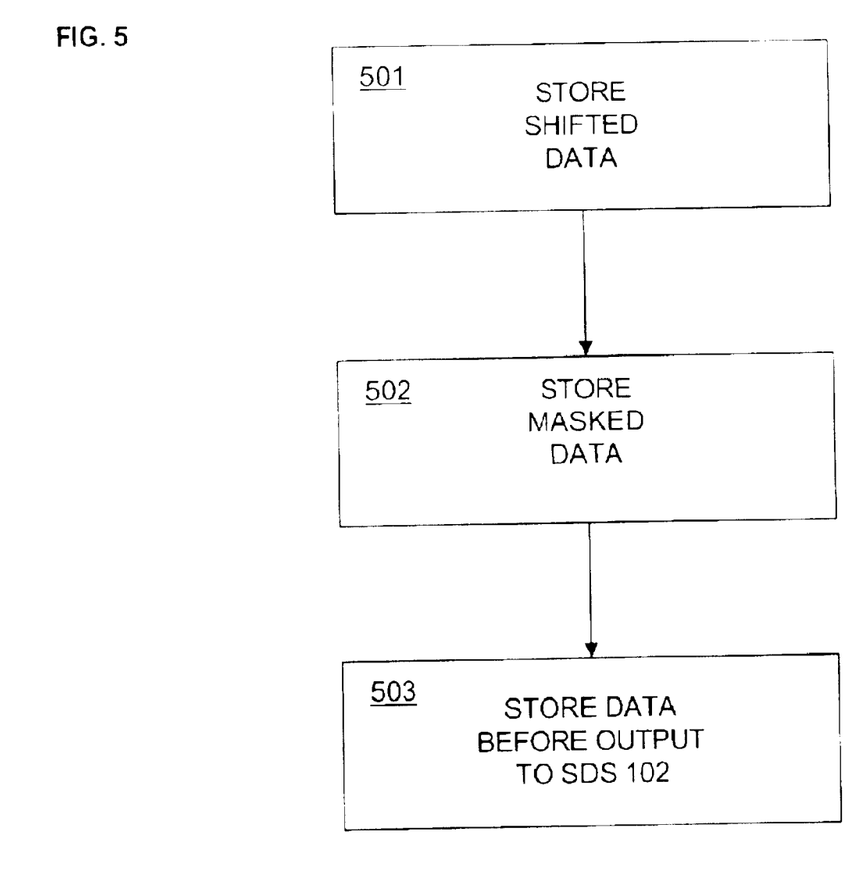
FIG. 5 depicts an exemplary data storage method according to the present invention.

FIG. 3 depicts the pipelined architecture of the hardware format function for 1 bpp data. Note that the pipelines for 1-bpp data (FIG. 3) and 2-bpp data (FIG. 4) are similar and all functions, with the exception of 2-bpp to 1-bpp reduction, can be shared. From FIGS. 3 and 4, and with further reference to the flow chart of FIG. 5, it can be seen that the pipeline contains three stages. Stage 1 (501) stores the shifted data 301 as it comes into the format function. Stage 2 (502) stores the data 302 after it has been masked with the mask 204 provided in the second descriptor. Stage 3 (503) stores the data 303 before it is output to the SDS 102. The format block 105 writes the formatted data back into the SDS 102. Other data manipulation operations, such as rotation, may then be performed on the data prior to printing. The system processor can move printable data from the SDS to the printheads as appropriate. Any stage in the format block 105 can be configured to wait until all the input data required for that stage is presented. When any stage is waiting for data from a previous stage, the pending stage is held until the data becomes available. As a non-limiting example, this will happen when resolution reduction or 2-bpp to 1-bpp reduction is performed. By holding later stages to ensure that they are full before continuing, one descriptor can be processed in a single clock cycle.

With reference to FIG. 4, Stage 1 depicts the original input data being bit shifted by an arbitrary amount, "shift." This shifted data is passed to Stage 2.

Stage 2 illustrates a resolution-reduction operation; each bit of Stage 2 output is an even-ordered bit from the output of Stage 1. Since only half the data in a word is used in this case, data from two consecutive shift operations (Stage 1) is required to complete a full word of Stage 2 output. The output of the second Stage 1 operation is represented by the "Next Shifted Word" object. The data is further modified in Stage 2 by optionally applying a mask to the data word using a bit-wise logical AND operation between the data word and the mask word.

Stage 3 illustrates that adjacent bits may be combined by applying a bit-wise logical OR operation. In FIG. 3, adjacent bits are not combined and Stage 3 simply passes on the output of Stage 2. In FIG. 4, the adjacent bits are combined and the output of Stage 3 reflects this. When adjacent bits are combined, the effective size of the input is reduced by 2 to 1, requiring an additional data word input to Stage 3 (output from Stage 2). This is represented by the "Next Masked Word" object in FIG. 4.

Each of these stages can be configured either by the system processor via the format logic control registers or on a raster line-by-line basis by the descriptor in the descriptor list read from the SDS by the system processor.

One skilled in the art will recognize that the present invention can be extended to handle n-bit per pixel data where n is any integer. N adjacent pixels can be combined to form one pixel. In some embodiments, n adjacent pixels can be combined using one or more OR gates. The mask can also be modified to support n-bit per pixel data. In such an embodiment, n masks would be needed for masking n bits before combining bits. Embodiments capable of handling n-bit per pixel data can be configured to process data using n masks. A pixel combination indicator indicative of the number of bits to combine can be stored in a configuration register.

Non-printable Data

In some cases, the formatted data will not contain printable data. This can occur, for example, when in a sparsely populated area of the page, the shingle mask removes all of the dots in a given swath. It is important for speed in processing to not continue operation on non-printable information. For example, if a swath did not contain printable data after the formatting process, then it may not be necessary to continue passing the non-printable data into subsequent functions such as rotate and print. Rather, it would be advantageous to skip the non-printable data and start processing more meaningful output. Therefore, to enable the system processor 101 to easily determine when data is non-printable, the system processor can provide a bit in the system data store that indicates if the processed swath contains dots. If the swath does not contain dots, the swath can be discarded. In one preferred embodiment, the bit can be stored in a register.

Formatting a Raster Line

Figure 6:
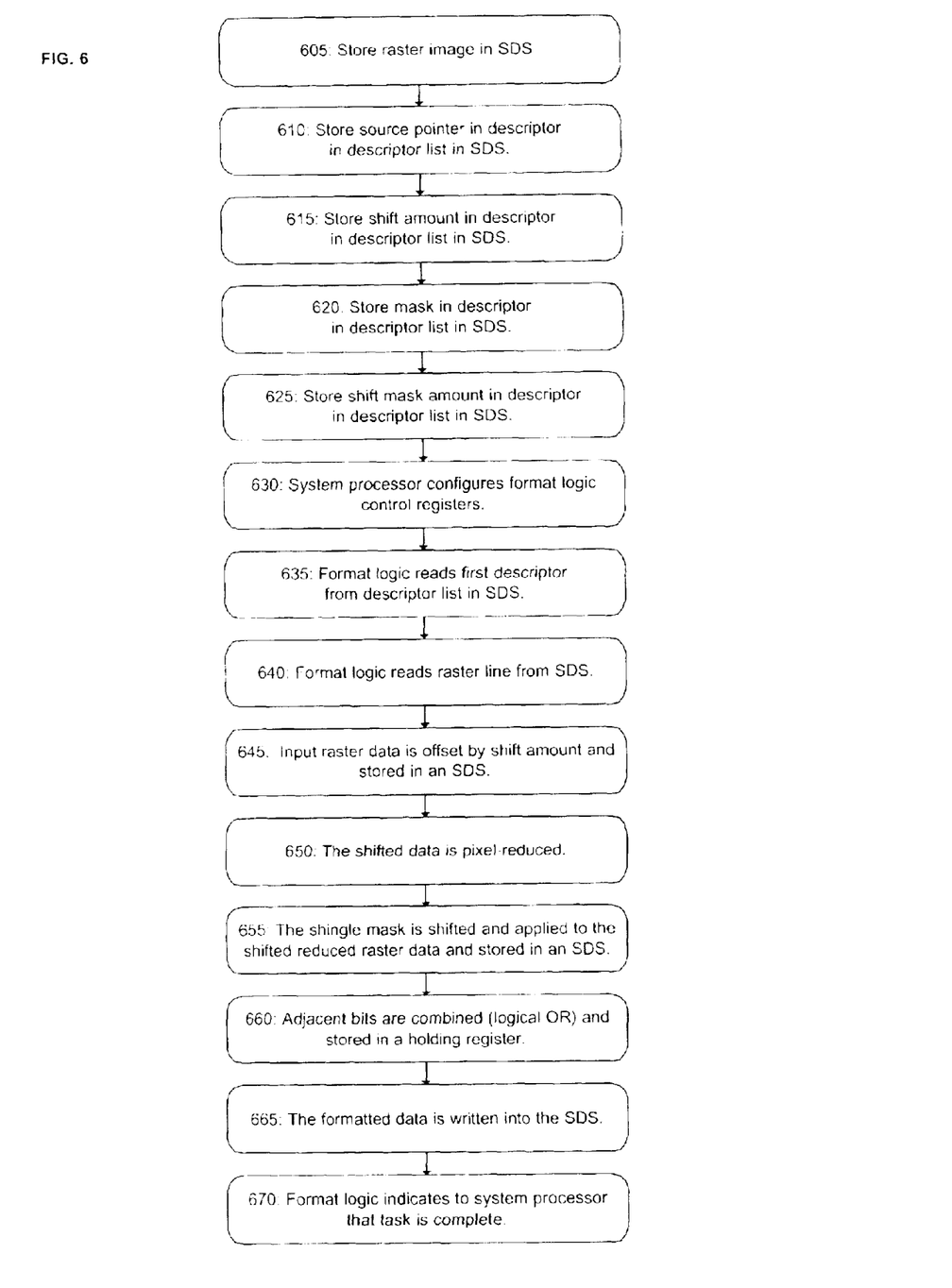
FIG. 6 depicts a block diagram of an exemplary data formatting method according to the present invention.

FIG. 6 depicts a flowchart showing the various steps taken to format a raster line in one exemplary embodiment. One skilled in the art will recognize that other orderings of operations and alternative sequences of the formatting steps described above and below may be implemented in the present invention. In some embodiments, one or more steps may be omitted as appropriate.

Referring to FIG. 6, the following steps are taken:

605: Store raster image in SDS.
610: Store source pointer in descriptor in descriptor list in SDS.
615: Store shift amount in descriptor in descriptor list in SDS.
620: Store mask in descriptor in descriptor list in SDS.
625: Store shift mask amount in descriptor in descriptor list in SDS.
630: System processor configures format logic control registers.
635: Format logic reads first descriptor from descriptor list in SDS.
640: Format logic reads raster line from SDS.
645: Input raster data is offset by shift amount and stored in an SDS.
650: The shifted data is pixel-reduced.
655: The shingle mask is shifted and applied to the shifted reduced raster data and stored in an SDS.
660: Adjacent bits are combined (logical OR) and stored in a holding register.
665: The formatted data is written into the SDS.
670: Format logic indicates to system processor that task is complete.

The embodiments described above are given as illustrative examples only. It will be readily appreciated by those skilled in the art that many deviations may be made from the specific embodiments disclosed in this specification without departing from the invention. Accordingly, the scope of the invention is to be determined by the claims below rather than being limited to the specifically described embodiments above.

What is claimed is:

1. A system for formatting data for a printhead, comprising:
   a. a system data store for storing:
      i. a raster image,
      ii. a source data address for indicating a location within the system data store where a portion of the raster image is stored,
      iii. a first shift amount,
      iv. a mask for specifying which pixels within the raster image should be printed, and
      v. a mask shift amount; and
   b. a system processor coupled to the system data store, wherein the system processor performs the steps of:
      i. storing in the system data store a first portion of the raster image located at the source data address, as offset by the first shift amount,
      ii. storing in the system data store a masked version of the first portion of the raster image, using the mask offset by the mask shift amount, and
      iii. outputting the masked version of the raster image to the system data store.

2. The system of claim 1, and further comprising a printhead, wherein the system processor performs the further step of outputting the masked version to the printhead.

3. The system of claim 1, wherein the system processor comprises an ASIC.

4. The system of claim 1, wherein the system processor comprises an FPGA.

5. The system of claim 1, wherein the system processor is further programmed or adapted to send the masked version of the raster image to the printhead if it includes printable image data.

6. The system of claim 1, wherein the first shift amount is a unidirectional bit shift.

7. The system of claim 1, wherein the first shift amount corresponds to a right shift.

8. The system of claim 1, wherein the step of storing a masked version further comprises the step of ANDing the raster image data with the mask.

9. The system of claim 1, wherein the system processor performs a resolution reduction step before the outputting step.

10. The system of claim 9, wherein the resolution reduction step further comprises the step of selecting adjacent pixels of the raster image data to reduce resolution.

11. A system for formatting data for a printhead, comprising:
    a. a system data store for storing:
       i. a raster image,
       ii. a source data address for indicating a location within the system data store where a portion of the raster image is stored, and
       iii. a shift amount; and
    b. a system processor coupled to the system data store, wherein the system processor performs the steps of:
       i. performing an offset according to the shift amount on a first portion of the raster image located at the source data address to provide a processed raster image, and
       ii. storing the processed raster image in the system data store.

12. The system of claim 11, wherein the source data address is stored within a configuration register.

13. The system of claim 11, wherein the shift amount is stored within a configuration register.

14. A system for formatting data for a printhead, comprising:
    a. a system data store for storing:
       i. a raster image,
       ii. a source data address for indicating a location within the system data store where a portion of the raster image is stored, and
       iii. a print mask; and
    b. a system processor coupled to the system data store, wherein the system processor performs the steps of:

i. performing a mask according to the print mask on a first portion of the raster image located at the source data address to provide a processed raster image, and ii. storing the processed raster image in the system data store.

15. The system of claim 14, wherein the mask is shifted by a mask shift amount.

16. The system of claim 14, wherein the mask or source data address is stored within a configuration register.

17. A system for formatting data for a printhead, comprising:

a. a system data store for storing:
i. a raster image,
ii. a source data address for indicating a location within the system data store where a portion of the raster image is stored, and
iii. a resolution reduction mode indicator; and b. a system processor coupled to the system data store, wherein the system processor performs the steps of:
i. reducing the resolution of the first portion of the raster image located at the source data address according to the resolution reduction mode indicator to provide a processed raster image, and
ii. storing the processed raster image in the system data store.

18. The system of claim 17, wherein the resolution reduction mode indicator or source data address is stored within a configuration register.

19. A system for formatting data for a printhead, comprising:

a. a system data store for storing:
i. a raster image,
ii. a source data address for indicating a location within the system data store where a portion of the raster image is stored,
iii. a pixel combination indicator, and b. a system processor coupled to the system data store, wherein the system processor performs the steps of:

i. combining two or more adjacent pixels of the first portion of the raster image located at the source data address according to the pixel combination indicator to provide a processed raster image, and
ii. storing the processed raster image in the system data store.

20. A method for formatting data for a printhead, comprising the steps of:

a. retrieving a first portion of a raster image located at a source data address;

b. performing an offset according to a shift amount on the first portion of the raster image to provide a first processed raster image;

c. performing a mask according to a print mask on the first portion of the raster image to provide a second processed raster image;

d. reducing the resolution of the first portion of the raster image according to a resolution reduction indicator to provide a third processed raster image;

e. storing at least one of the processed raster images in a system data store.

21. A system for formatting data for a printhead, comprising:

a. an indication means for indicating a first portion of a raster image located at a source data address;

b. a shift means for shifting a first portion of the raster image and providing a first processed raster image;

c. a mask means for masking a first portion of the raster image and providing a second processed raster image;

d. a resolution reduction means for reducing the resolution of a first portion of the raster image and providing a third processed raster image; and e. a storing means for storing at least one of the processed raster images in a system data store.

* * * * *